(12) United States Patent
Azami

(10) Patent No.: US 10,340,550 B2
(45) Date of Patent: Jul. 2, 2019

(54) LITHIUM ION SECONDARY CELL

(71) Applicant: NEC ENERGY DEVICES, LTD., Sagamihara-shi, Kanagawa (JP)

(72) Inventor: Takeshi Azami, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 219 days.

(21) Appl. No.: 14/383,816

(22) PCT Filed: Mar. 27, 2013

(86) PCT No.: PCT/JP2013/058978
§ 371 (c)(1),
(2) Date: Sep. 8, 2014

(87) PCT Pub. No.: WO2013/150937
PCT Pub. Date: Oct. 10, 2013

(65) Prior Publication Data
US 2015/0104701 A1    Apr. 16, 2015

(30) Foreign Application Priority Data
Apr. 5, 2012    (JP) .................................. 2012-086289

(51) Int. Cl.
*H01M 10/0567*    (2010.01)
*H01M 4/505*    (2010.01)
(Continued)

(52) U.S. Cl.
CPC ....... *H01M 10/0567* (2013.01); *H01M 4/131* (2013.01); *H01M 4/362* (2013.01);
(Continued)

(58) Field of Classification Search
CPC ........... H01M 10/052; H01M 10/0525; H01M 10/0567; H01M 2220/20; H01M 2220/30;
(Continued)

(56) References Cited

U.S. PATENT DOCUMENTS

2001/0031391 A1* 10/2001 Hironaka ................ H01M 2/06
429/94
2004/0043300 A1* 3/2004 Utsugi .............. H01M 10/0567
429/329
(Continued)

FOREIGN PATENT DOCUMENTS

CN    101207190 A    6/2008
CN    102187501 A    9/2011
(Continued)

OTHER PUBLICATIONS

International Search Report of PCT/JP2013/058978 dated May 21, 2013 [PCT/ISA/210].
(Continued)

*Primary Examiner* — Lingwen R Zeng
(74) *Attorney, Agent, or Firm* — Sughrue Mion, PLLC

(57) ABSTRACT

Provided is a lithium ion secondary cell using lithium manganese-based oxide as a positive electrode active material, wherein SEI films suppressing deterioration during repeated charge/discharge are easily formed not only on the negative electrode surface, but also on the positive electrode surface, deterioration in capacity upon use, in particular, under high-temperature environments is suppressed, charge/discharge cycle characteristics are improved and lifespan is lengthened. The lithium ion secondary cell includes a positive electrode active material layer containing lithium manganese-based oxide as a positive electrode active material, a negative electrode active material layer containing a negative electrode active material, and an electrolytic solution used to immerse the positive electrode active material layer and the negative electrode active material layer, wherein the positive electrode active material layer contains carbon nanotubes and the electrolytic solution contains sulfonic acid ester.

7 Claims, 3 Drawing Sheets

(51) Int. Cl.
*H01M 4/131* (2010.01)
*H01M 4/36* (2006.01)
*H01M 4/62* (2006.01)
*H01M 10/052* (2010.01)
*H01M 4/587* (2010.01)
*H01M 10/0525* (2010.01)

(52) U.S. Cl.
CPC ........... *H01M 4/505* (2013.01); *H01M 4/587* (2013.01); *H01M 4/625* (2013.01); *H01M 10/052* (2013.01); *H01M 10/0525* (2013.01); *H01M 2220/20* (2013.01); *H01M 2220/30* (2013.01); *H01M 2300/0025* (2013.01); *Y02E 60/122* (2013.01); *Y02T 10/7011* (2013.01)

(58) Field of Classification Search
CPC ......... H01M 2300/0025; H01M 4/131; H01M 4/362; H01M 4/505; H01M 4/587; H01M 4/625; Y02E 60/122; Y02T 10/7011
See application file for complete search history.

(56) References Cited

U.S. PATENT DOCUMENTS

| | | | |
|---|---|---|---|
| 2006/0032046 A1* | 2/2006 | Nathan | ................ C25D 9/04 29/623.5 |
| 2010/0140554 A1* | 6/2010 | Oki | .................... H01M 4/131 252/500 |
| 2010/0255356 A1* | 10/2010 | Fujii | ................... H01G 11/06 429/94 |
| 2011/0151327 A1 | 6/2011 | Imanari | |
| 2011/0171371 A1 | 7/2011 | Li et al. | |
| 2012/0301795 A1 | 11/2012 | Kaneko et al. | |
| 2013/0065125 A1 | 3/2013 | Sawaki et al. | |
| 2013/0248772 A1* | 9/2013 | Jo | ...................... B82Y 30/00 252/503 |

FOREIGN PATENT DOCUMENTS

| | | |
|---|---|---|
| CN | 103109404 A | 5/2013 |
| JP | 11-354107 A | 12/1999 |
| JP | 2000-077071 A | 3/2000 |
| JP | 2003-077476 A | 3/2003 |
| JP | 2004-281368 A | 10/2004 |
| JP | 2005-149750 A | 6/2005 |
| JP | 2006-004811 A | 1/2006 |
| JP | 2011-192543 A | 9/2011 |
| WO | 2011099580 A1 | 8/2011 |

OTHER PUBLICATIONS

Communication dated Dec. 25, 2015, issued by the State Intellectual Property Office of the P.R.C. in corresponding Chinese Application No. 201380018467.2.

* cited by examiner (A)

(B)

(C)

LITHIUM ION SECONDARY CELL

CROSS REFERENCE TO RELATED APPLICATIONS

This is a National Stage of International Application No. PCT/JP2013/058978 filed Mar. 27, 2013, claiming priority based on Japanese Patent Application No. 2012-086289 filed Apr. 5, 2012, the contents of all of which are incorporated herein by reference in their entirety.

TECHNICAL FIELD

The present invention relates to a lithium ion secondary cell having superior cycle characteristics and long lifespan.

BACKGROUND

Lithium ion secondary cells are widely used as small cells for portable electronic devices or personal computers, high-capacity large chargeable/dischargeable cells for power sources such as electric vehicles (EVs), hybrid vehicles (HEVs) and plug-in hybrid vehicles (PHVs), and power storage systems for large-scale energy storage and power supplies for large-scale disasters, and ultra-large charge/discharge cells used in electric power substation forming electrical grids called "smart grids". Lifespan required for lithium ion secondary cells for small electronic devices such as portable electronic devices is 1 to 3 years, while lengthened lifespan of 10 to 20 years is required for large lithium ion secondary cells. Furthermore, lifespan of at least 25 to 30 years is required for ultra-large lithium ion secondary cells. For this reason, little deterioration in cell capacity upon repeated charge/discharge and high maintenance of cell capacity, that is, superior charge/discharge cycle characteristics, are required. A lithium ion secondary cell has a basic structure in which a positive electrode active material layer containing a positive electrode active material and a negative electrode active material layer containing a negative electrode active material, which are respectively formed on current collectors, face each other via a separator, and the positive and negative electrode active material layers are immersed in an electrolytic solution and these components are accommodated in an outer package. Regarding the lithium ion secondary cell having such a structure, each of the positive electrode active material and the negative electrode active material reversibly intercalates and deintercalates lithium ions, thereby performing charge/discharge cycles.

As lithium ion secondary cells with long lifespan, lithium ion secondary cells which improve cycle characteristics by using lithium manganese-based composite oxide and lithium nickel-based composite oxide having a three-dimensional host structure as positive electrode active materials are reported in Patent Document 1.

Also, lithium ion secondary cells wherein cyclic sulfonic acid ester containing at least two sulfonyl groups is contained in an electrolytic solution, a surface film that is solid electrolyte interphase; SEI film for suppressing deterioration caused by charge/discharge is formed on a negative electrode surface, release of manganese from manganese oxide contained in a positive electrode is suppressed and adhesion of manganese to the negative electrode surface is suppressed and charge/discharge cycle characteristics are improved in Patent Document 2, lithium ion secondary cells wherein a thin passivation film is formed on the interface between the positive electrode and the electrolyte by preliminarily thermally treating a positive electrode using lithium manganese spinel in an electrolytic solution in a discharge state and release of Mn is thus suppressed, thereby improving coulomb efficiency and cycle characteristics and storage characteristics at high temperatures in Patent Document 3, and secondary cells wherein the cyclic sulfonic acid ester contained in the electrolytic solution is decomposed by charging and then aging, the sulfur-containing protective film is formed on the positive electrode, and rapid charge/discharge cycle lifespan at high temperatures are improved in Patent Document 4 or the like were reported. Alternatively, lithium ion secondary cells which improve current collection and rate characteristics or cycle characteristics by incorporating carbon nanotubes as the conductive material to form a low-resistance conductive network in the positive electrode containing manganese-based composite oxide as an active material in Patent Document 5 was reported.

PRIOR ART DOCUMENTS-Patent documents

Patent Document 1: JP Patent Application Publication No. 2000-077071
Patent Document 2: JP Patent Application Publication No. 2004-281368
Patent Document 3: JP Patent Application Publication Hei 11-354107
Patent Document 4: JP Patent Application Publication No. 2006-4811
Patent Document 5: JP Patent Application Publication No. 2003-077476

SUMMARY OF THE INVENTION

Problems to be Solved by the Invention

However, it is pointed out that the positive electrode using lithium manganese-based composite oxide as an active material is deteriorated by distortion of crystals caused by change in valence of manganese in crystals resulting from deintercalation and intercalation of lithium ions upon charge/discharge, furthermore, positive electrode by loss of crystal structures caused by release of manganese ions from crystals is deteriorated. In particular, under high-temperature environments, release of manganese ions tends to be hastened by repeating charge/discharge and cell capacity tends to decrease. In some cases, the released manganese is precipitated on the surface of the negative electrode active material or the separator, blocks transfer of lithium ions and degrades cycle characteristics.

The lithium ion secondary cell disclosed in Patent Document 5 improves rate characteristics or cycle characteristics by adding carbon nanotubes to the positive electrode to form a low-resistance conductive network. However, there is a problem in that Mn release which is the cause of deteriorating lithium manganese-based composite oxide-based positive electrode is not suppressed.

Patent Documents 1 to 4 disclose inhibition of release of transition metals from the positive electrode, in particular, Patent Documents 3 and 4 disclose inhibition of release of transition metals by forming SEI films on the positive electrode. However, regarding the lithium ion secondary cell disclosed in Patent Document 3, positive electrode SEI films are formed by decomposing the electrolytic solution by thermal treatment and it is thus difficult to control formation of the films. Regarding the secondary cell disclosed in Patent Document 4, positive electrode active material, first charge/discharge conditions, aging conditions and the like are set and a protective film containing sulfur is formed under the conditions. In the case of Comparative Example 6 in which 1,3-propane sultone is used as the sulfur-containing compound, reaction rate of oxidative decomposition may be not sufficient and sufficient protective films may be not formed according to type of sulfur-containing compound. As such, technical progress of formation of high-quality SEI films on the positive electrode is not sufficient yet and there are technical problems in terms of the type of additive added to the electrolytic solution and the method for decomposing the additive to form the positive electrode SEI film.

Regarding the additive, additives to form high-quality SEI films on the negative electrode have been generally used to date. This function of the additives is the same as the case of forming SEI films on the positive electrode. For this reason, an ideal additive, high-quality SEI films can be formed on both the positive electrode and the negative electrode using one type of additive. As the additive, in the case in which an additive for the positive electrode is used in conjunction with an additive for the negative electrode, the additive for the positive electrode not inhibiting the action of the additive for the negative electrode should be selected. It is also important to form SEI films with an additive having a high reaction rate that is decomposition rate. The reason for this is that formation of films is not realized when the additive does not have high reaction rate. Even though the reaction rate of the additive is changed according to reaction method or conditions, the additive preferably has a high reaction rate, which means decomposition rate, under ordinary driving conditions such as driving voltage and driving temperature.

From the facts described above, for conventional lithium ion secondary cells using the lithium manganese composite oxide-based positive electrode, it is an object to solve problems associated with long-term lifespan characteristics, in particular, deterioration in capacity of the positive electrode resulting from Mn release on the degree to be required by ultra-large lithium ion secondary cells for EVs, HEVs, PHVs, large power storage and power grids.

An object of the present invention is to provide a lithium ion secondary cell using lithium manganese-based oxide as a positive electrode active material, wherein the lithium ion secondary cell easily forms SEI films suppressing deterioration during repeated charge/discharge not only on the negative electrode surface, but also the positive electrode surface, inhibits deterioration in capacity upon use, in particular, under high-temperature environments, improves charge/discharge cycle characteristics and provides long lifespan.

Means to Solve the Problems

The inventors of the present invention found that SEI films can be considerably efficiently formed on the positive electrode surface by incorporating carbon nanotubes in the positive electrode containing lithium manganese-based oxide as a positive electrode active material and promoting reaction of sulfonic acid ester contained in the electrolytic solution during first charge/discharge. The inventors of the present invention found that these SEI films do not inhibit permeation of lithium ions, inhibit permeation of manganese ions and remarkably suppress release of manganese from the lithium manganese-based oxide of the positive electrode active material. In addition, the inventors of the present invention discovered that a film formation reaction of the sulfonic acid ester contained in the electrolytic solution can be remarkably facilitated in the presence of carbon nanotubes and SEI films can be formed on the positive electrode surface by so-called "catalytic reaction" of the carbon nanotubes upon first charging. The present invention was completed based on these findings.

That is, the present invention relates to a lithium ion secondary cell comprising a positive electrode active material layer containing lithium manganese-based oxide as a positive electrode active material, a negative electrode active material layer containing a negative electrode active material and an electrolytic solution used to immerse the positive electrode active material layer and the negative electrode active material layer, wherein the positive electrode active material layer comprises carbon nanotubes and the electrolytic solution contains sulfonic acid ester.

Effects of the Invention

The lithium ion secondary cell of the present invention is a lithium ion secondary cell using lithium manganese-based oxide as a positive electrode active material, wherein SEI films suppressing deterioration during repeated charge/discharge are easily formed not only on the negative electrode surface but also on the positive electrode surface, deterioration in capacity upon use, in particular, under high-temperature environments is suppressed, charge/discharge cycle characteristics are improved and lifespan is lengthened.

Figure 1:
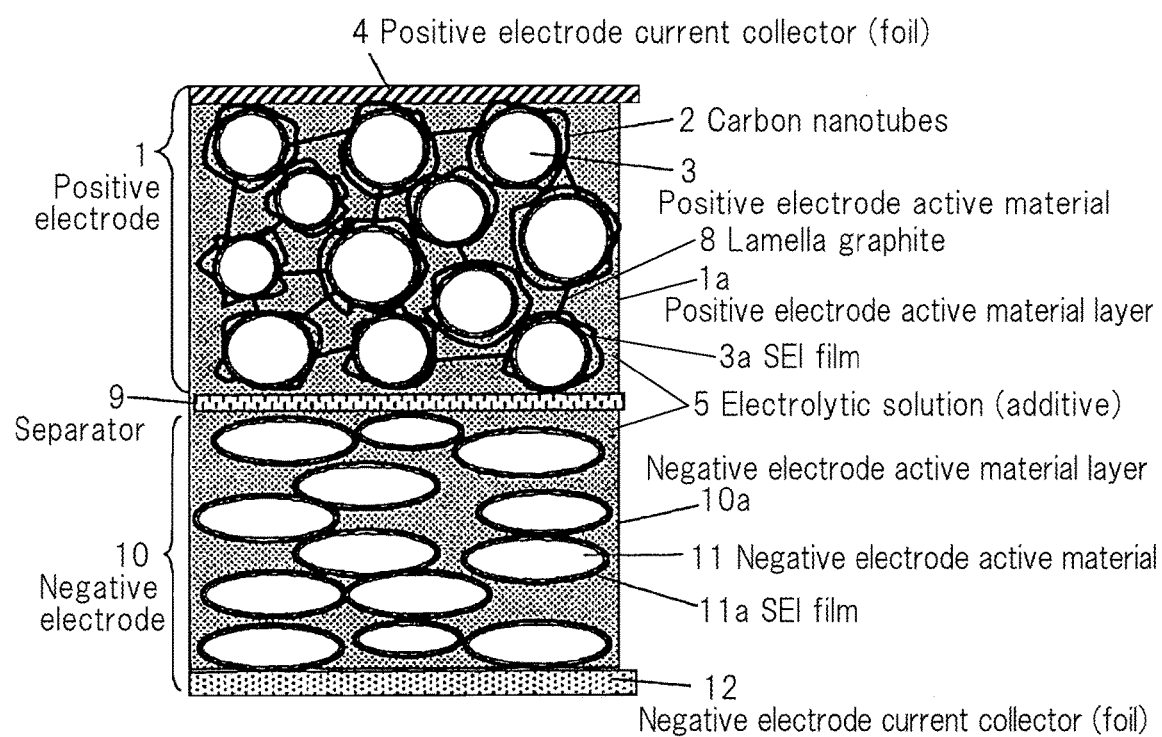
FIG. 1 is a schematic diagram illustrating a structure of a lithium ion secondary cell of the present invention.

1—Positive electrode
1a—Positive electrode active material layer
2—Carbon nanotube
3—Positive electrode active material
3a, 11a—SEI film
4—Positive electrode current collector
5—Electrolytic solution
8—Lamella graphite
9—Separator
10—Negative electrode
10a—Negative electrode active material layer
11—Negative electrode active material
12—Negative electrode current collector

DETAILED DESCRIPTION OF THE INVENTION

The lithium ion secondary cell of the present invention includes a positive electrode active material layer containing lithium manganese-based oxide as a positive electrode active material, a negative electrode active material layer containing a negative electrode active material and an electrolytic solution for immersing these layers.

[Positive Electrode]

A positive electrode has a structure in which a positive electrode active material is integrated by a positive electrode binder and is bound as a positive electrode active material layer on a positive electrode current collector.

The positive electrode active material deintercalates lithium ions into an electrolytic solution during charging, intercalates the lithium ions from the electrolytic solution during discharging, and contains lithium manganese-based oxide. The lithium manganese-based oxide may have any structure such as layered-, spinel- or olivine-structure. Specifically, examples of the lithium manganese-based oxide include $LiMnO_2$, $LiMn_2O_4$, $LiNiMnO_2$, $LiNiCoMnO_2$, $LiMnMgO_4$, $Li_2MnO_3$, $LiCoMnO_2$, $LiMnPO_4$ or the like.

As a positive electrode active material, in addition to the lithium manganese-based oxide, lithium-based oxide not containing manganese may be mixed with the proviso that functions of the lithium manganese-based oxide are not impaired. Specifically, examples of the positive electrode active material include $LiCoO_2$, $LiNiO_2$, or those wherein a part of these transition metals of $LiCoO_2$ or $LiNiO_2$ is substituted by other metals; $LiNi_{1/3}Co_{1/3}Mn_{1/3}O_2$ or the like. A content of the lithium-based oxide not containing manganese in the positive electrode active material is for example 0 to 45% by mass.

The lithium manganese-based oxide has a mean particle size, for example, of 1 to 30 μm.

The positive electrode active material layer including the positive electrode active material contains carbon nanotubes. The carbon nanotubes function as a catalyst facilitating film formation reaction of sulfonic acid ester contained in the electrolytic solution.

Carbon nanotubes comprise a single layer or coaxial-multiple layers of cylindrical graphene sheets having six-numbered rings of carbon. Carbon nanotubes preferably comprise coaxial-multiple layers. Alternatively, both ends of cylindrical carbon nanotubes may open, but preferably close with semispherical fullerene containing the five- or seven-membered ring of carbon. The outermost cylinder of carbon nanotubes preferably has a diameter of, for example, not less than 0.5 nm and not more than 50 nm. The carbon nanotubes do not contain fibrous carbon or carbon fibers. In addition, the fibrous carbon has a diameter of 150 to 500 nm, and the carbon fiber has a diameter of 5 to 10 μm and does not have a cylindrical shape.

The carbon nanotubes preferably have a mean D/G ratio obtained by Raman spectroscopy, of not less than 0.2 and not more than 0.95. By using carbon nanotubes having the mean D/G ratio obtained by Raman spectroscopy, satisfying the range, suitable SEI films can be formed upon first charge/discharge and lifespan of cells can be greatly lengthened. When the mean D/G ratio is not more than 0.95, carbon nanotubes have excellent surface crystallinity and excellent catalytic functions, and stable SEI films are easily formed on the surface of the positive electrode, and when the mean D/G ratio is not less than 0.2, a homogeneous SEI film having high density and stability is easily formed on the positive electrode, and charge/discharge cycle characteristics of cells can be improved. The mean D/G ratio obtained by Raman spectroscopy is more preferably not less than 0.25 and not more than 0.8, even more preferably not less than 0.3 and not more than 0.6.

Raman spectroscopy is a method generally used for evaluating surface crystallinity of carbon materials. As Raman bands of graphite, G band that appears near 1580~1600 $cm^{-1}$ corresponding to the in-plane vibration mode and D band that appears near 1360 $cm^{-1}$ derived from in-plane defects are observed. When each peak intensity is referred to as IG or ID, lower peak intensity ratio ID/IG means higher graphitization degree. A ratio of a peak intensity IG of G band corresponding to in-circumferential surface vibration mode of carbon nanotubes and a peak intensity ID of D band derived from in-circumferential defects "ID/IG ratio", simply referred to "D/G ratio" is known to be generally controlled by thermal treatment temperature and the low D/G ratio is obtained by relatively high temperature of thermal treatment and the high D/G ratio is obtained by low temperature of thermal treatment.

The mean D/G ratio obtained by Raman spectroscopy may be a value obtained by the following measurement method. An area of 50 μm×50 μm randomly selected from a projected image of the positive electrode active material layer is set to a measurement surface, a spot size measured by Raman spectroscopy is set to φ1 μm, mapping measurement is performed on the measurement surface at positions that is 676 spots spaced by a distance of 1 μm, and D/G ratios of the respective spots are calculated from the measured Raman light and a mean of the D/G ratios is defined as a mean D/G ratio. There are spots at which carbon nanotubes are not present because of the positive electrode not being covered with carbon nanotubes and Raman peaks derived from carbon nanotubes cannot be measured. Such a spot is excluded for calculation of the mean.

Additionally, carbon nanotubes having a D/G ratio, obtained by Raman spectroscopy, of not less than 0.2 and not more than 0.95 preferably cover not less than 40% and not more than 90% of a surface area of the surface of the positive electrode active material layer. The carbon nanotubes having a D/G ratio of not less than 0.2 and not more than 0.95 are greatly effective in forming SEI films on the surface of the positive electrode active material. By defining the ratio of the surface of the positive electrode active material layer covered with carbon nanotubes referred to as "covering ratio" within the range described above, the SEI film can be effectively formed on the positive electrode active material and release of manganese from the positive electrode active material can be effectively suppressed. The covering ratio is more preferably not less than 60%, even more preferably not less than 70%. Alternatively, when the covering ratio is not more than 90%, filling of the positive electrode active material with carbon nanotubes is suppressed, therefore inhibition of lithium ion intercalation and deintercalation due to insufficient permeation of the electrolytic liquid among the positive electrode active material can be suppressed, or in the production process, a long time to incorporate the electrolytic solution in the positive electrode active material layer cannot be required.

In the same manner as in the mean D/G ratio, a ratio of surface area of the positive electrode active material layer covered with carbon nanotubes having a D/G ratio of not less than 0.2 and not more than 0.95 can be measured by acquiring D/G ratios at respective spots of measurement surfaces of the positive electrode active material layer, dividing the number of spots having the D/G ratio of not less than 0.2 and not more than 0.95 by the total number of measured all spots and representing the resulting value as a percentage to obtain a covering ratio.

The covering ratio at which the carbon nanotubes cover the positive electrode active material layer can be controlled according to type of the carbon nanotubes and amount of added carbon nanotubes. The covering ratio at which the positive electrode active material layer is covered with the carbon nanotubes converges on a value determined by distribution of D/G ratio of the carbon nanotubes, when the entire surface of positive electrode active material layer is covered with carbon nanotubes. Accordingly, the entire surface of the positive electrode active material layer is covered with a carbon nanotube material having a narrow D/G ratio distribution width of not less than 0.2 and not more than 0.95 so as to increase covering ratio. Such a covering ratio can be generally controlled by changing distribution of D/G ratio of carbon nanotubes and amount of added carbon nanotubes.

The carbon nanotubes preferably have an aspect ratio of not less than 100 and not more than 900. The aspect ratio of the carbon nanotubes is a ratio of length to diameter of carbon nanotubes. When the aspect ratio of the carbon nanotubes is not less than 100, covering of the positive electrode active material with carbon nanotubes is easy and conduction between positive electrode active materials is possible, and when the aspect ratio is not more than 900, deterioration in workability can be suppressed in the process of covering the positive electrode active material, or deterioration in dispersibility is suppressed and viscosity increase can be suppressed in the production of slurry. The aspect ratio of the carbon nanotubes is more preferably not less than 150 and not more than 700, even more preferably not less than 200 and not more than 500.

Carbon nanotubes preferably have a specific surface area not less than 40 $m^2/g$ and not more than 2,000 $m^2/g$. In general, regarding relation between diameter and specific surface area of carbon nanotube, as diameter of carbon nanotube decreases, specific surface area thereof increases. When the specific surface area is not more than 2,000 $m^2/g$, there is a great effect in suppressing a phenomenon in which carbon nanotubes react with the electrolytic solution to produce a gas and thereby inhibit formation of the SEI film. Meanwhile, when the specific surface area is not less than 40 $m^2/g$, the surface of the positive electrode active material can be efficiently covered. Such carbon nanotubes efficiently cover the positive electrode active material layer and have superior conductive auxiliary material properties, as compared to conventionally used Ketjen black having a specific surface area of 800 $m^2/g$ to 1,300 $m^2/g$, or acetylene black or carbon black having a specific surface of 40 $m^2/g$ to 100 $m^2/g$.

A content of the carbon nanotubes in the positive electrode active material layer is for example 0.1 to 5% by mass.

The positive electrode active material layer may contain lamella graphite which shape is plate-like as the conductive material together with carbon nanotubes. When the positive electrode active material layer contains carbon nanotubes and lamella graphite, suitable gaps can be formed between spherical or massive positive electrode active materials. For this reason, formation of flow path of electrolytic solution in the positive electrode active material layer is easy, and movement of lithium ions is facilitated. In addition, carbon nanotubes have the function of retaining the electrolytic solution therein, depletion of electrolytic solution can be suppressed during charge/discharge cycles and rapid resistance increase resulting from depletion of electrolytic solution is also suppressed. This is different from an electrode structure in which microparticles of carbon black or the like fill gaps among the active materials. Alternatively, when a part of an edge surface of lamella graphite contacts the surface of lithium manganese-based oxide, in particular, conductivity is excellent. Accordingly, cells having high capacity and superior cycle characteristics can be implemented. A content of lamella graphite in the positive electrode active material layer is for example 0.5 to 5% by mass.

Examples of a binder for forming the positive electrode active material layer on the positive electrode current collector by integrating the positive electrode active material, carbon nanotubes and the like include polyvinylidene fluoride (PVDF), styrene butadiene rubber (SBR), acrylic polymers, polyimide, polyamide-imide or the like. A solvent of organic binders is preferably N-methyl-2-pyrrolidinone (NMP). Alternatively, in an aqueous binder such as SBR, a thickening agent such as carboxymethyl cellulose (CMC) may be used. A content of the binder is preferably 1% by mass to 10% by mass, more preferably 2% by mass to 6% by mass, with respect to the positive electrode active material. When the content of binder is within the range, sufficient binding force is obtained, an increase in charge transfer resistance is effectively suppressed while lithium ions permeate and deterioration in cell capacity is considerably effectively suppressed.

Any positive electrode current collector may be used so long as it supports the positive electrode active material layer in which the positive electrode active material, carbon nanotubes, and optionally, other materials such as conductive material, are integrated by the binder, and has conductivity enabling conduction with an exterior terminal. An aluminum foil or the like may be used.

[Negative Electrode]

The negative electrode has a structure in which a negative electrode active material is integrated by a negative electrode binder and is bound as a negative electrode active material layer on a negative electrode current collector.

Any negative electrode active material may be used so long as it intercalates lithium ions from the electrolytic solution upon charging and deintercalates lithium ions into the electrolytic solution upon discharging. Specifically, natural graphite, crystalline artificial graphitizing agents obtained by thermally treating coal, petroleum pitch and the like at high temperatures, or amorphous carbon obtained by thermally treating coal, petroleum pitch coke, acetylene pitch coke and the like may be used. Alternatively, silicon materials such as silicon or silicon oxide, metals that may form an alloy with lithium, for example, aluminum, lead, tin, indium, bismuth, silver, barium, calcium, mercury, palladium, platinum, tellurium, zinc or lanthanum, or metal oxides, for example, aluminum oxide, tin oxide, indium oxide, zinc oxide or lithium oxide may be used. These substances may be used alone or in combination of two or more types. Metal oxide is preferably used in conjunction with the metal incorporated therein from the viewpoint that intercalation and deintercalation of lithium ions are performed at different voltages during charging and discharging and rapid volume change of the negative electrode active material layer is suppressed.

Additionally, the negative electrode active material may have a spherical or massive shape. The reason for having these shapes is that transfer of lithium ions through electrode is facilitated because crystals are aligned in various directions even after rolling in the production of the electrode, and high-output power property is excellent because gaps among the active materials into which the electrolytic solution permeates can be easily formed. Regarding the size of the negative electrode active material, the negative electrode active material which has greater volume change during charging and discharging preferably has a smaller diameter because volume change of the negative electrode active material layer caused by volume change of particles is suppressed. The carbon material has a mean particle size of, for example, 1 to 40 μm or the like.

The binder for forming the negative electrode active material layer on the negative electrode current collector by integrating the negative electrode active material may be the same as the example of the binder used for the positive electrode active material. Alternatively, the negative electrode active material layer may optionally contain a conductive material such as carbon black.

Any negative electrode current collector may be used so long as it supports the negative electrode active material layer in which the negative electrode active material is integrated by a binder and enables conduction to an exterior terminal and the negative electrode current collector may be a copper foil or the like.

[Electrolytic Solution]

The electrolytic solution is obtained by dissolving an electrolyte in a non-aqueous organic solvent capable of dissolving lithium ions. The positive electrode and the negative electrode are immersed in the electrolytic solution so that the positive and negative electrodes can intercalate and deintercalate lithium ions during charging and discharging.

Preferably, the solvent of the electrolytic solution is stable to operation potentials of cells and has a low viscosity to immerse the electrodes regarding use environments of cells. Specifically, examples of the solvent include cyclic carbonates such as ethylene carbonate (EC), propylene carbonate (PC), butylene carbonate (BC) or vinylene carbonate (VC); chain carbonates such as dimethylcarbonate (DMC), diethylcarbonate (DEC), methylethylcarbonate (MEC) or dipropylcarbonate (DPC); or polar organic solvents such as γ-lactone, N,N'-dimethylformamide, dimethylsulfoxide, N-methylpyrrolidone, or m-cresol. The substances may be used alone or in combination of two or more types. In addition, when the negative electrode active material contains a silicon material, it may contain fluorinated ether. The fluorinated ether has a high affinity to silicon and improves cycle characteristics, in particular, capacity retention ratio.

The electrolyte contained in the electrolytic solution is for example a salt composed of a cation of an alkali metal such as lithium, potassium or sodium and an anion of a halogen-containing compound such as $ClO_4^-$, $BF_4^-$, $PF_6^-$, $CF_3SO_3^-$, $(CF_3SO_2)_2N^-$, $(C_2F_5SO_2)_2N^-$, $(CF_3SO_2)_3C^-$ or $(C_2F_5SO_2)_3C^-$. These salts may be used alone or in combination of two or more types. Or, the electrolyte may be a gel-type electrolyte in which a polymer gel is contained in the electrolytic solution.

A concentration of the electrolyte in the electrolytic solution is preferably not less than 0.01 mol/L and not more than 3 mol/L, more preferably, not less than 0.5 mol/L and not more than 1.5 mol/L. When the concentration of the electrolyte is within the range, cells having improved stability and high reliability, and contributing to reduction of environmental load can be obtained.

The electrolytic solution contains sulfonic acid ester. The sulfonic acid ester is first reductively decomposed previous to a solvent and forms SEI films allowing the negative electrode active material to react with lithium ions and preventing the negative electrode active material from reacting with the solvent on the surface of the negative electrode active material, thereby suppressing contact between the electrolytic solution and the surface of the negative electrode active material and degradation of the electrolytic solution. Furthermore, the sulfonic acid ester suppresses volume variation of the negative electrode active material and loss of the negative electrode active material from the negative electrode active material layer.

Meanwhile, through the catalytic function of the carbon nanotubes contained in the positive electrode active material layer, the sulfonic acid ester is reductively decomposed upon first charge/discharge and SEI films are formed on the surface of the positive electrode active material. SEI films formed on the surface of the positive electrode active material in the presence of carbon nanotubes are efficiently formed to desired thicknesses, although not verified detailed matter, the SEI films are different from films simply formed by thermal decomposition in terms of density, conductivity and the like, and suppress release of manganese from the positive electrode active material. The SEI films are easily formed under common driving conditions of cells, suitable films are formed during initial charging and aging, charge/discharge cycle characteristics of cells are greatly improved and long lifespan can be obtained even use under high temperature environments.

The sulfonic acid ester is for example cyclic monosulfonic acid ester such as 1,3-propanesultone or 1,4-butanesultone. Alternatively, the sulfonic acid ester is for example cyclic sulfonic acid ester represented by Formula (1):

[Formula 1]

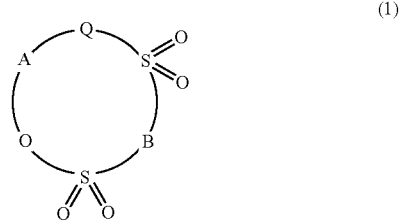

(1)

In Formula (1), Q represents an oxygen atom, a methylene group or a single bond, A represents a substituted or unsubstituted C1-C6 alkylene group, a carbonyl group or a sulfinyl group, and B represents a substituted or unsubstituted alkylene group or an oxygen atom. In Formula (1), a substituent of the C1-C6 alkylene group represented by A is preferably an alkyl group, a fluorine atom, an oxy group or the like and the number of substituent may be one or more. Examples of the alkyl group include a methyl group, an ethyl group or the like. Examples of a fluorine atom-substituted alkylene group include a fluoroalkylene group or perfluoroalkylene group, all hydrogen atoms of which are substituted by fluorine atoms. The oxy group may be present at an end or in the middle of a carbon chain of the alkylene group. The substituent of the alkylene group represented by B is preferably an alkyl group, a fluorine atom, an oxy group or the like. The number of substituent may be one or more. Specifically, examples of the substituent of the alkylene group represented by B may be the same as those of the substituent of alkylene group represented by A.

Specifically, examples of the cyclic sulfonic acid ester represented by Formula (1) include those represented by the following Formulae (101) to (123).

[Formula 2]

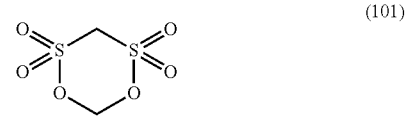

(101)

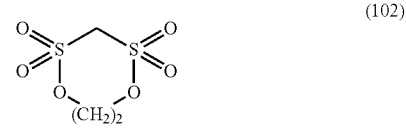

(102)

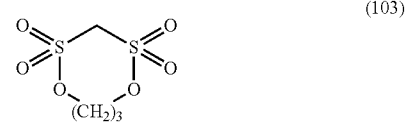

(103)

(104) 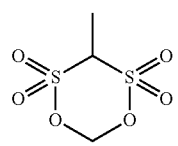
(105) 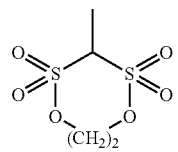
(106) 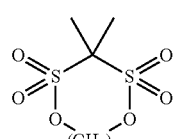
(107) 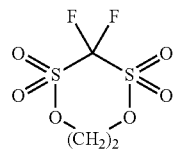
(108) 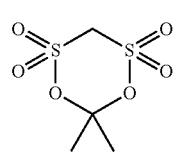
(109) 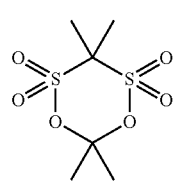
(110) 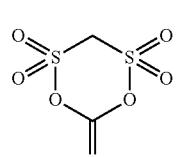
(111) 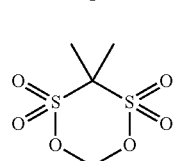
(112) 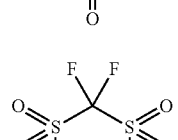
(113) 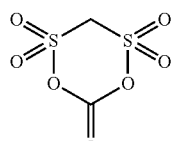
(114) 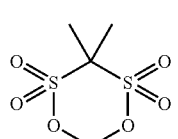
(115) 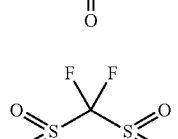
(116) 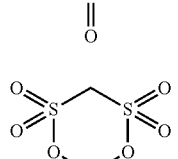
(117) 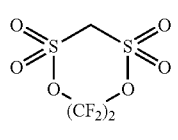
(118) 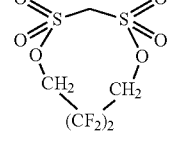
(119) 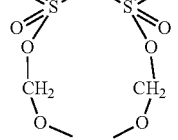
(120) 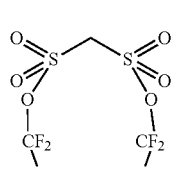
(121) 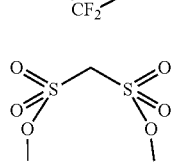

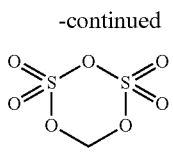
(122)

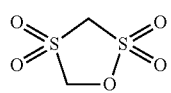
(123)

The sulfonic acid ester is for example a chain-type sulfonic acid ester represented by Formula (2).

[Formula 3]

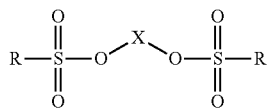
(2)

Formula (2), X represents a C1-C6 alkylene group and R represents a C1-C6 alkyl group, wherein two R groups may be identical or different.

The sulfonic acid ester may be used alone or in combination of two or more types.

The sulfonic acid ester is preferably contained in an amount of not less than 0.1% by mass and not more than 6.0% by mass with respect to the total mass of the solvent and the sulfonic acid ester. When the sulfonic acid ester is not less than 0.1% by mass, the effect of forming sufficient SEI films on the surface of the positive electrode active material is excellent and when the sulfonic acid ester is not more than 6.0% by mass, a rise in charge transfer resistance of lithium ions by SEI films formed on the negative electrode active material is suppressed and lifespan of cells is lengthened.

[Lithium Ion Secondary Cell]

The lithium ion secondary cell of the present invention preferably has a structure in which a positive electrode active material layer faces a negative electrode active material layer via a separator and is accommodated in an outer package.

Any separator may be used so long as it suppresses conduction between the positive electrode and the negative electrode, does not inhibit permeation of lithium ions and has durability to the electrolytic solution. Specifically, examples of materials used for the separator include microporous membranes made from polyolefin such as polypropylene or polyethylene, cellulose, polyethylene terephthalate, polyimide, polyvinylidene fluoride or the like. These materials may be used as porous films, fabrics and non-woven fabrics or the like.

The outer package preferably has strength enough to stably maintain the positive electrode, the negative electrode, the separator and the electrolytic solution, is electrical-chemically stable to these materials and has watertightness. Specifically, the outer package is for example stainless steel, nickel-plated iron, aluminum, silica or a laminate film coated with alumina, and a resin used for the laminate film is polyethylene, polypropylene, polyethylene terephthalate or the like. These substances may be formed to a structure including a single layer or multiple layers.

The lithium ion secondary cell may have any shape of cylindrical, flat wound horn, stacked horn, coin, flat wound laminate and stacked laminate shapes.

A configuration of an example of the lithium ion secondary cell is shown in FIG. 1. The lithium ion secondary cell shown in FIG. 1 has SEI films formed by charge/discharge. A negative electrode 10 having a negative electrode active material layer 10a containing a negative electrode active material 11 integrated by a binder on a negative electrode current collector 12, and a positive electrode 1 having a positive electrode active material layer 1a containing a positive electrode active material 3, carbon nanotubes 2 and a lamella graphite 8 integrated by a binder on a positive electrode current collector 4 face each other via respective separators 9 made of a porous film to prevent contact between the negative and positive electrodes and these components are accommodated in a laminate outer package (not shown). The negative electrode active material 11 is covered with a SEI film 11a and the positive electrode active material 3 is covered with a SEI film 3a. The laminate outer package is filled with an electrolytic solution 5 and the electrolytic solution 5 permeates into the negative electrode active material layer and the positive electrode active material layer, each of the negative or positive electrode has a negative electrode terminal (not shown) or a positive electrode terminal (not shown). Terminals are connected to parts of the current collectors in which active material layers are not formed, exposed to the outside of the outer package and are connected to an external power supply during charge or an apparatus.

An example of a method for producing the lithium ion secondary cell is described below. A positive electrode active material layer is produced on a positive electrode current collector using materials for positive electrode active material layers including a positive electrode active material, carbon nanotubes, and optionally a conductive material and a binder. The method for producing the positive electrode active material layer is for example a coating method such as doctor blade method or die coater method, a CVD method, a sputtering method or the like. Or, after the positive electrode active material layer is previously formed, a thin film may be formed by a method such as deposition or sputtering to be obtained as the positive electrode current collector. In the same manner, a negative electrode active material layer is formed on a negative electrode current collector using a material for negative electrode active material layers containing a negative electrode active material and a binder. The terminal is connected to each current collector end, the components are stacked via the separator, the stack is then accommodated in an outer package, an electrolytic solution is injected into an outer package, the terminal is exposed to the outside of the outer package, and the outer package is sealed. The first charge is performed under conditions including driving voltage of cells and room temperature up to 50° C. and the like and is aged for a predetermined time while being left lying, thereby forming SEI films on the surface of the active material.

EXAMPLES

Hereinafter, the lithium ion secondary cell of the present invention will be described in detail.

Figure 2:
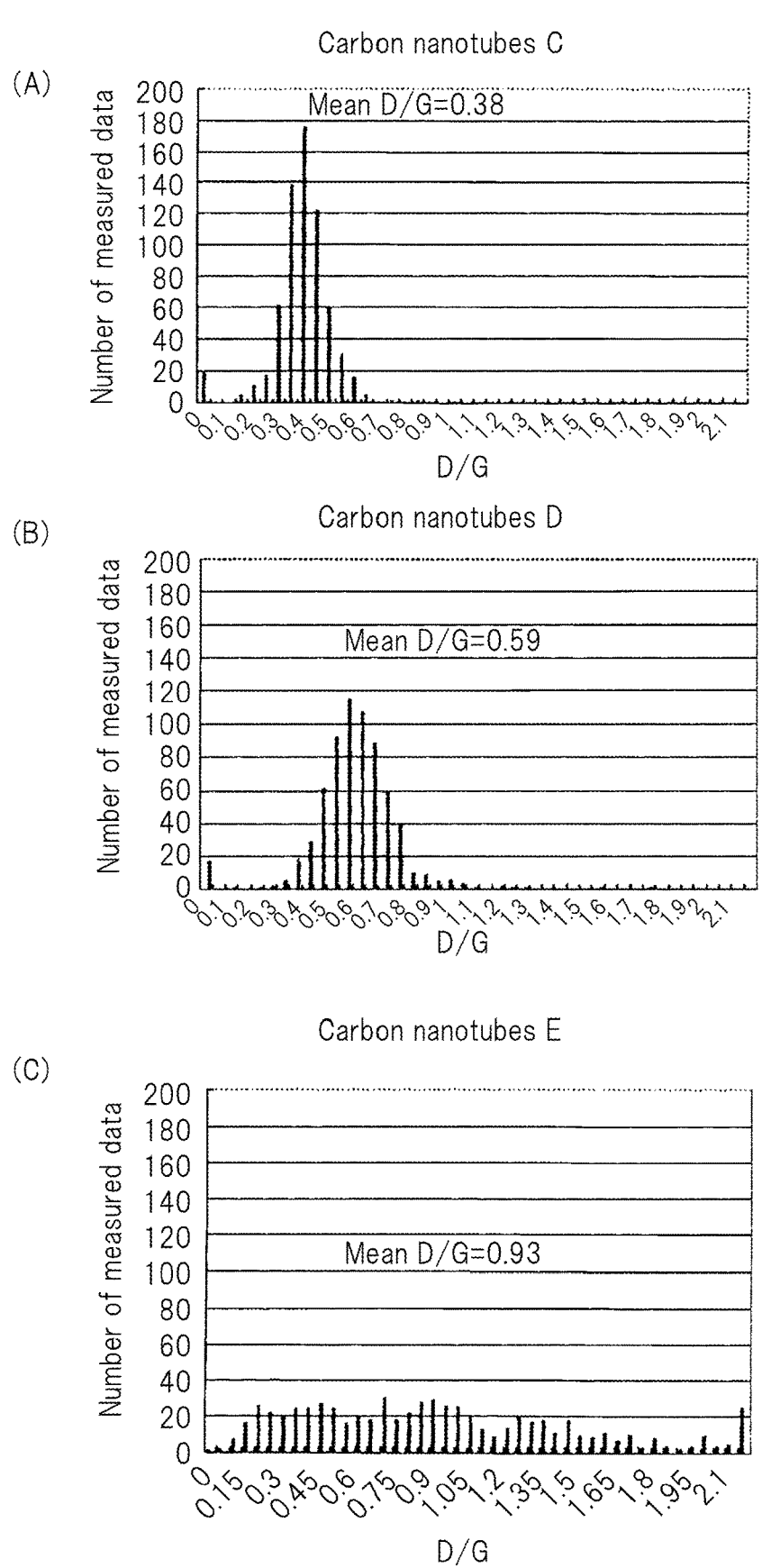
FIG. 2 is graphs showing a D/G ratio distribution obtained by Raman spectroscopy, of carbon nanotubes used for the lithium ion secondary cell of the present invention.

Mean D/G ratios of carbon nanotubes A to F, carbon black, lamella graphite, used in Example, are shown in Table 1. Histrograms of D/G ratios of carbon nanotubes C, D and E are shown in FIGS. 2A, 2B and 2C. Frequency distribution of D/G ratios obtained by Raman spectroscopy at respective spots of an area of 50 μm×50 μm on the surface of the positive electrode active material layer was plotted. The carbon nanotubes C and D had a narrow D/G ratio distribution while carbon nanotubes E had a wide D/G ratio distribution. All the carbon nanotubes had a mean diameter of about 10 nm, an aspect ratio of about 150 and a specific surface area of about 200 m$^2$/g. Or, carbon black used as Comparative Example had a mean diameter of primary particles of 60 nm, an aspect ratio of 1.1 and a specific surface area of 60 m$^2$/g.

TABLE 1

| | Raman mean D/G ratio ($I_D/I_G$) |
|---|---|
| Carbon nanotubes A | 0.11 |
| Carbon nanotubes B | 0.20 |
| Carbon nanotubes C | 0.38 |
| Carbon nanotubes D | 0.59 |
| Carbon nanotubes E | 0.93 |
| Carbon nanotubes F | 1.11 |
| Carbon black | 1.12 |
| Lamella graphite as conductive auxiliary material | 0 10 |

Example 1

[Production of Cell]

4% by mass of poly vinylidene fluoride (PVDF) as a binder, 0.6% by mass of carbon nanotubes C, and the balance of a lithium manganese spinel ($LiMn_2O_4$) powder having a mean particle size of 10 μm for a positive electrode active material were homogeneously dispersed in NMP using Trimix having excellent stirring and mixing to prepare a positive electrode slurry. The positive electrode slurry was homogeneously coated onto a positive electrode current collector as an aluminum foil having a thickness of 20 μm using a coater, dried by evaporating NMP, a rear surface of the positive electrode current collector was also coated in the same manner as above and was then dried and a density was then controlled with a roll press to produce a positive electrode active material layer at both sides of the current collector. A mass of the positive electrode active material layer per unit area was 50 mg/cm².

94% by mass of massive natural graphite surface-coated with amorphous carbon having a mean particle size of 20 μm, and 5% by mass of PVDF as a binder and 1% by mass of carbon black for a negative electrode active material were homogeneously dispersed in NMP to prepare a negative electrode slurry. The negative electrode slurry was homogeneously coated onto a copper foil having a thickness of 10 μm as a negative electrode current collector using a coater and then dried by evaporating NMP, and a density was then controlled with a roll press to produce a negative electrode active material layer. A mass of the negative electrode active material layer per unit area was 20 mg/cm².

The electrolytic solution was prepared by adding 2.0% by mass of cyclic sulfonic acid ester represented by Formula (101) represented by S1 in Table 2 to a solution of 1 mol/L $LiPF_6$ as an electrolyte in a solvent containing ethylene carbonate (EC) and diethyl carbonate (DEC) at a volume ratio of 35:65.

The obtained positive electrode was cut to 4.0 cm×2.4 cm, and the obtained negative electrode was cut to 4.5 cm×2.8 cm. Except an area of 4.0 cm×1.0 cm at a side of the positive electrode and an area of 4.5 cm×1.0 cm at a side of the negative electrode were respectively coated with the positive electrode slurry and the negative electrode slurry to obtain parts of current collectors where active material layers are not formed, for connection of terminals. A positive electrode terminal made of aluminum having a width of 7 mm, a length of 8 cm and a thickness of 0.1 mm was welded to the part of the current collector where the positive electrode active material layer is not formed. In the same manner, a negative electrode terminal made of nickel having the same shape as the positive electrode terminal was welded to the part of the current collector where the negative electrode active material layer is not formed. Both surfaces of the positive electrode were covered with 5 cm×3 cm polypropylene separators and a negative electrode active material layer was disposed thereon such that the negative electrode active material layer faced the positive electrode active material layer to produce an electrode stack. Then, the electrode stack was inserted into two aluminum laminate films having a size of 7 cm×5 cm, three sides excluding one side of a long side were thermally sealed to a width of 8 mm, the electrolytic solution was injected, and the remaining side was thermally sealed to produce a small laminate cell as a battery.

Figure 3:
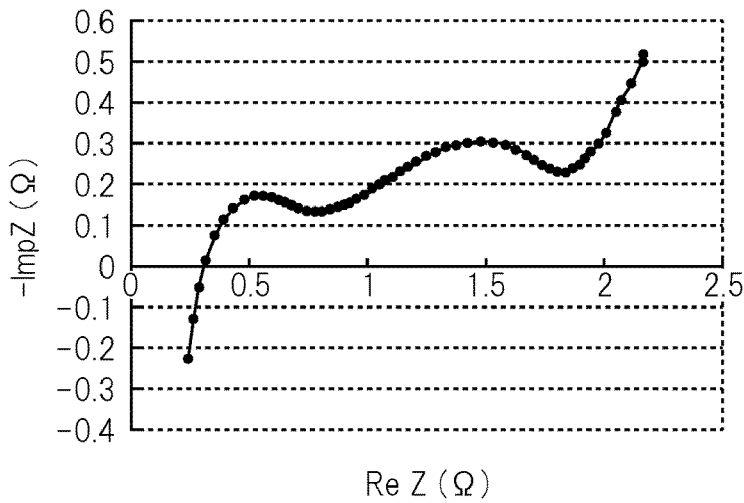
FIG. 3 is graphs showing impedance of the lithium ion secondary cell of the present invention.
Figure 3:
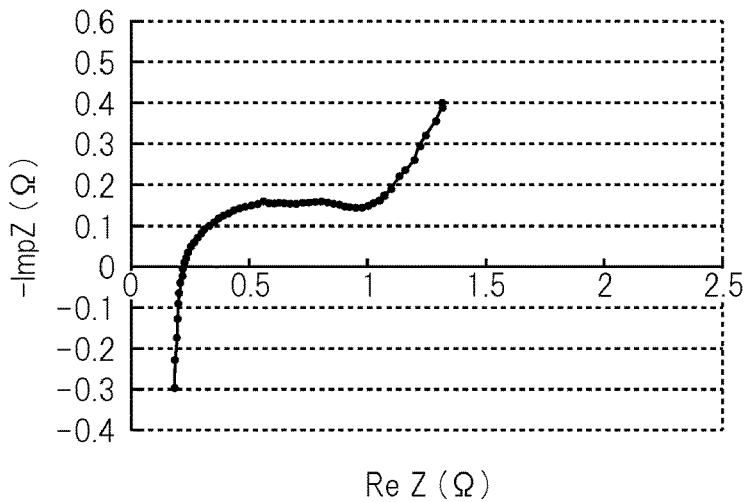
Figure 3:
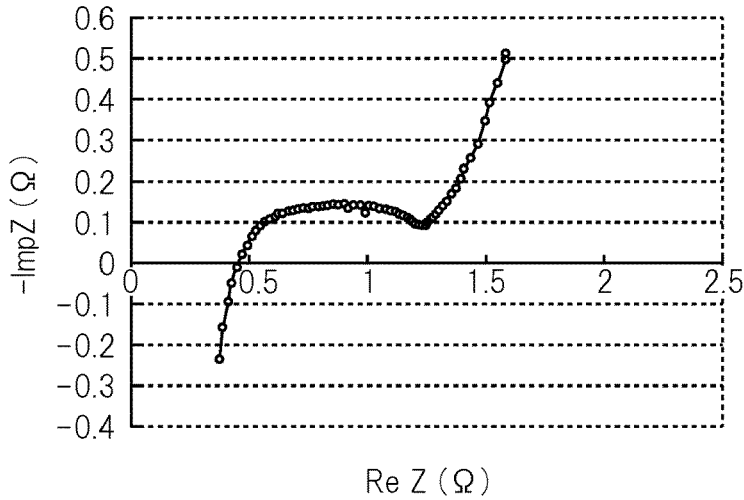

A cell produced in the same manner as above except that the content of carbon nanotubes C in the positive electrode active material was 2% by mass was first charged to 2V, was aged in a full charge state of 4.2V for 14 days at a temperature of 45° C. and alternating current impedance after aging was measured. Results are shown in FIG. 3A. Two components of charge transfer resistance were present, which indicates that SEI films were formed on not only the negative electrode on but also the positive electrode.

A cell was produced in the same manner as above, except that carbon nanotubes F were used instead of the carbon nanotubes C and was first charged and then aged. Regarding this cell, as can be seen from impedance shown in FIG. 3B, weak two peaks were observed as components of charge transfer resistance, which indicates that SEI films are present on not only the negative electrode, on but also the positive electrode.

On the other hand, a cell was produced in the same manner as above, except that carbon black having a mean D/G of 1.12 was used instead of the carbon nanotubes C, was first charged and then aged. Regarding this cell, as can be seen from impedance shown in FIG. 3C, one component of charge transfer resistance was present, which means that the SEI film was formed on only the negative electrode and the SEI film was not formed on the positive electrode.

[Measurement of Capacity Retention Ratio]

1,000 charge/discharge cycle tests were performed in a 55° C. constant-temperature bath, capacity retention ratio was measured and lifespan was evaluated. Regarding charging, constant current charge was performed at 1 C to an upper limit voltage of 4.2V, subsequently constant voltage charge was performed at 4.2V, and the charging was performed for the total time of 2.5 hours. Regarding discharging, constant current discharge was performed at 1 C to 2.5V. In addition, charge/discharge cycles were performed at a considerably high temperature of 55° C. The reason for charge/discharge cycle test at extremely high temperature of 55° C. is that characteristic deterioration caused by release of manganese can be early recognized. The capacity after charge/discharge cycle test was measured and a ratio of the capacity after charge/discharge cycle test to the capacity before charge/discharge cycle test was calculated. Results are shown in Table 2.

Examples 2-25

Cells were produced in the same manner as in Example 1, except that the positive electrode active materials, carbon nanotubes, added amounts thereof and sulfonic acid ester shown in Table 2 to 4 were used and coating ratio of the positive electrode active material layer coated with carbon nanotubes and capacity retention ratio were measured. Results are shown in Tables 2 to 4.

Symbols of Tables represent the following.

Mn spinel: $LiMn_2O_4$
Mn layer: $LiMnO_2$
Mn olivine: $LiMnPO_4$
Ni layer: $LiNi_{0.8}Co_{0.2}O_2$
S1: Cyclic sulfonic acid ester represented by Formula (101)
S2: Cyclic sulfonic acid ester represented by Formula (102)
PS: Propane sultone SL: Sulfonic acid ester represented by Formula (4)

[Formula 4]

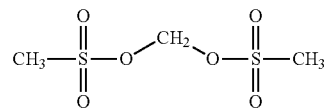

(4)

S3: cyclic sulfonic acid ester represented by Formula (104)
S4: cyclic sulfonic acid ester represented by Formula (107)
S5: cyclic sulfonic acid ester represented by Formula (122)
In Example 15, 70% by mass of Mn spinel and 24% by mass of Ni layer were added as the positive electrode active material, and in Example 16, 70% by mass of Mn spinel, 22% by mass of Ni layer and 2.0% by mass of lamella graphite were added as the positive electrode active material in the positive electrode active material layer. Now, lamella graphite was also added and a coating ratio of the surface of the positive electrode active material layer by Raman spectroscopy was not measured.

TABLE 2

| Evaluation of cells | Positive electrode active material | Mean D/G of carbon nanotubes | Amount of added carbon nanotubes (% by mass) | Electrolytic solution additive | Positive electrode coating ratio (%) | 55° C. capacity retention ratio (%) @1000 cycle |
|---|---|---|---|---|---|---|
| Example 1 | Mn spinel | 0.38 | 0.6 | S1 | 21 | 58 |
| Example 2 | Mn spinel | 0.38 | 1.2 | S1 | 42 | 62 |
| Example 3 | Mn spinel | 0.38 | 1.7 | S1 | 60 | 66 |
| Example 4 | Mn spinel | 0.38 | 2.0 | S1 | 70 | 68 |
| Example 5 | Mn spinel | 0.38 | 2.6 | S1 | 91 | 65 |
| Example 6 | Mn spinel | 0.38 | 3.0 | S1 | 95 | 60 |

TABLE 3

| Evaluation of cells | Positive electrode active material | Mean D/G of carbon nanotubes | Amount of added carbon nanotubes (% by mass) | Electrolytic solution additive | Positive electrode coating ratio (%) | 55° C. capacity retention ratio (%) @1000 cycle |
|---|---|---|---|---|---|---|
| Example 7 | Mn spinel | 0.38 | 2.0 | S2 | 70 | 68 |
| Example 8 | Mn layer | 0.38 | 2.0 | S2 | 70 | 67 |
| Example 9 | Mn olivine | 0.38 | 2.0 | S2 | 71 | 68 |
| Example 10 | Mn spinel | 0.11 | 2.0 | S2 | 40 | 61 |
| Example 11 | Mn spinel | 0.20 | 2.0 | S2 | 48 | 63 |
| Example 12 | Mn spinel | 0.59 | 2.0 | S2 | 70 | 65 |
| Example 13 | Mn spinel | 0.93 | 2.0 | S2 | 43 | 63 |
| Example 14 | Mn spinel | 1.11 | 2.0 | S2 | 32 | 59 |

TABLE 4

| Evaluation of cells | Positive electrode active material | Mean D/G of carbon nanotubes | Amount of added carbon nanotubes (% by mass) | Amount of added lamella graphite (% by mass) | Electrolytic solution additive | Positive electrode coating ratio (%) | 55° C. capacity retention ratio (%) @1000 cycle |
|---|---|---|---|---|---|---|---|
| Example 15 | Mn spinel + Ni layer | 0.38 | 2.0 | 0 | S2 | 70 | 69 |
| Example 16 | Mn spinel + Ni layer | 0.38 | 2.0 | 2.0 | S2 |  | 70 |
| Example 17 | Mn spinel | 0.11 | 2.0 | 0 | PS | 40 | 53 |
| Example 18 | Mn spinel | 0.38 | 2.0 | 0 | PS | 70 | 58 |
| Example 19 | Mn spinel | 1.11 | 2.0 | 0 | PS | 32 | 53 |
| Example 20 | Mn layer | 0.38 | 2.0 | 0 | PS | 70 | 58 |
| Example 21 | Mn olivine | 0.38 | 2.0 | 0 | PS | 71 | 58 |
| Example 22 | Mn spinel | 0.38 | 2.0 | 0 | SL | 70 | 68 |
| Example 23 | Mn spinel | 0.38 | 2.0 | 0 | S3 | 70 | 67 |
| Example 24 | Mn spinel | 0.38 | 2.0 | 0 | S4 | 70 | 68 |
| Example 25 | Mn spinel | 0.38 | 2.0 | 0 | S5 | 70 | 67 |

Comparative Examples 1-10

Cells were produced in the same manner as Example 1, except that the positive electrode active material, carbon nanotubes or carbon black or lamella graphite, amounts thereof and sulfonic acid ester shown in Table 5 were used. The coating ratio of the positive electrode active material layer coated with carbon nanotubes and capacity retention ratio were measured. Results are shown in Tables 5.

TABLE 5

| Evaluation of cells | Positive electrode active material | Mean D/G ratio | Amount of added carbon nanotubes (% by mass) | Amount of added carbon black (% by mass) | Amount of added lamella graphite (% by mass) | Electrolytic solution additive | Positive electrode coating ratio (%) | 55° C. capacity retention ratio (%) @1000 cycle |
|---|---|---|---|---|---|---|---|---|
| Comparative Example 1 | Mn spinel | 1.12 | 0 | 2.0 | 0 | S2 | | 43 |
| Comparative Example 2 | Mn spinel | 1.12 | 0 | 3.0 | 0 | S2 | | 43 |
| Comparative Example 3 | Mn spinel | 0.10 | 0 | 0 | 2 | S2 | | 41 |
| Comparative Example 4 | Mn layer | 1.12 | 0 | 2.0 | 0 | S2 | | 42 |
| Comparative Example 5 | Mn olivine | 1.12 | 0 | 2.0 | 0 | S2 | | 43 |
| Comparative Example 6 | Mn spinel | 0.11 | 2.0 | 0 | 0 | VC | 40 | 41 |
| Comparative Example 7 | Mn spinel | 0.38 | 2.0 | 0 | 0 | VC | 70 | 45 |
| Comparative Example 8 | Mn spinel | 1.11 | 2.0 | 0 | 0 | VC | 32 | 43 |
| Comparative Example 9 | Mn layer | 0.38 | 2.0 | 0 | 0 | VC | 70 | 45 |
| Comparative Example 10 | Mn olivine | 0.38 | 2.0 | 0 | 0 | VC | 71 | 45 |

Symbols of Tables represent the following. Symbols shown in Tables 1 to 4 represent the same described above.
VS: vinylene carbonate
Now, in the case in which carbon nanotubes are not added, coating ratio of the surface of the positive electrode active material layer was not measured by Raman spectroscopy.

As can be seen from Examples 1 to 25, the cell wherein carbon nanotubes were added to the positive electrode containing lithium manganese-based oxide and an additive containing sulfonic acid ester was used had little capacity deterioration and excellent charge/discharge cycle characteristics under the environment of a high temperature of 55° C. The reason for this is considered that high-quality SEI films were formed on the surface of the positive electrode active material and release of manganese from the positive electrode active material was suppressed even upon the first charge performed under the same conditions as driving conditions of cells by using carbon nanotubes and the additive containing sulfonic acid ester. Such an effect can be obtained from not only lithium manganese spinel-based materials, but also manganese olivine-based in Examples 9 and 21 or manganese layer-based in Examples 8 and 20 positive electrode active materials, or can be obtained, as additives, from not only Formula (101), Formula (102), Formula (104) in Example 23, Formula (107) in Example 24, and Formula (122) in Example 25, but also propane sultone in Examples 17-21 and a chain-type sulfonic acid ester compound in Example 22. Also, when carbon nanotubes in Examples 7, 10 to 14 being different in mean D/G ratio, obtained by Raman spectroscopy, were used, difference in capacity maintenance ratio was considered to be due to difference in reaction ratios at which SEI films were formed on the surface of the positive electrode active material. When the mean D/G ratio of carbon nanotubes is 0.2 to 0.95, particularly excellent characteristics are obtained. In addition, in the case in which carbon nanotubes having the same mean D/G ratio were used and the coating ratio was changed by changing amounts of added carbon nanotubes, particularly excellent properties are obtained when the coating ratio is 42% to 91%. Furthermore, in the case in which a Ni layer-type compound having the effect of suppressing release of manganese from the positive electrode active material is mixed with the positive electrode active materials in Examples 15 and 16, or the case in which lamella graphite in Example 16 was added as the conductive material, charge/discharge cycle characteristics were further improved.

On the other hand, as can be seen from Comparative Examples 1 to 10, cells in Comparative Examples 1, 2, 4 and 5 produced from the positive electrode containing lithium manganese-based oxide to which only carbon black was added without carbon nanotubes, and the cell in Comparative Example 3 to which lamella graphite was added as a conductive auxiliary material did not improve lifespan under high-temperature environments. Also, lithium ion secondary cells in Comparative Examples 6-10 using an additive containing no sulfonic acid ester also did not improve lifespan under high-temperature environments. These results indicate that SEI was not almost formed on the surface of the positive electrode active material under the conditions of Comparative Example, and it was effective to perform common first charge in the presence of both carbon nanotubes and the additive containing sulfonic acid ester for formation of the SEI film on the surface of the positive electrode active material.

INDUSTRIAL APPLICABILITY

The present invention is applicable to all of industrial fields that require power supply and industrial fields related to transmission, storage and supply of electrical energy.

Specifically, the present invention is applicable to power supply for mobile devices such as cellular phones and notebook computers, power supply for driving vehicles and the like.

The invention claimed is:

1. A lithium ion secondary cell comprising a positive electrode active material layer containing lithium manganese-based oxide as a positive electrode active material, a negative electrode active material layer containing a negative electrode active material, and an electrolytic solution used to immerse the positive electrode active material layer and the negative electrode active material layer,
wherein the positive electrode active material layer comprises carbon nanotubes and the electrolytic solution comprises sulfonic acid ester in amount of not less than 0.1% by mass and not more than 6.0% by mass with respect to the total mass of the solvent and the sulfonic acid ester,
wherein a surface of the positive electrode active material layer is covered in a ratio not less than 40% and not more than 90% of a surface area with the carbon nanotubes having a mean D/G ratio, measured by Raman spectroscopy, of not less than 0.3 and not more than 0.6, the outermost cylinder of carbon nanotubes has a diameter of not less than 0.5 nm and not more than 50 nm,
wherein solid electrolyte interface films cover the surface of the positive electrode active material, and
wherein the solid electrolyte films are obtained during an initial charge of the cell by decomposition of the sulfonic acid ester through a catalytic function of the carbon nanotubes.

2. The lithium ion secondary cell of claim 1, wherein the sulfonic acid ester is represented by Formula (1)

[Formula 1]

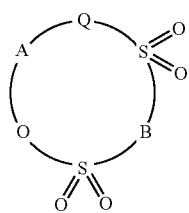

(1)

wherein Q represents an oxygen atom, a methylene group or a single bond, A represents a substituted or unsubstituted C1-C6 alkylene group, a carbonyl group or a sulfinyl group, and B represents a substituted or unsubstituted alkylene group or an oxygen atom.

3. The lithium ion secondary cell of claim 1, wherein the carbon nanotubes have an aspect ratio of not less than 100 and not more than 900.

4. The lithium ion secondary cell of claim 1, wherein the carbon nanotubes have a specific surface area of not less than 40 $m^2/g$ and not more than 2,000 $m^2/g$.

5. The lithium ion secondary cell of claim 1, wherein the positive electrode active material layer contains lamella graphite and the lamella graphite contacts a surface of lithium manganese-based oxide.

6. A lithium ion secondary cell comprising a positive electrode active material layer containing lithium manganese-based oxide as a positive electrode active material, a negative electrode active material layer containing a negative electrode active material, and an electrolytic solution used to immerse the positive electrode active material layer and the negative electrode active material layer,
wherein the positive electrode active material layer comprises carbon nanotubes and the electrolytic solution comprises sulfonic acid ester in amount of not less than 0.1% by mass and not more than 6.0% by mass with respect to the total mass of the solvent and the sulfonic acid ester,
wherein a surface of the positive electrode active material layer is covered in a ratio not less than 40% and not more than 90% of a surface area with the carbon nanotubes having a mean D/G ratio, measured by Raman spectroscopy, of not less than 0.3 and not more than 0.6,
wherein the outermost cylinder of carbon nanotubes has a diameter of not less than 0.5 nm and not more than 50 nm,
wherein two peaks are present in alternating current impedance of the cell,
wherein solid electrolyte interface films cover the surface of the positive electrode active material, and
wherein the solid electrolyte films are obtained during an initial charge of the cell by decomposition of the sulfonic acid ester through a catalytic function of the carbon nanotubes.

7. The lithium ion secondary cell of claim 1, wherein the solid electrolyte interface films comprise sulfonic acid ester.

* * * * *